Patented Jan. 16, 1940

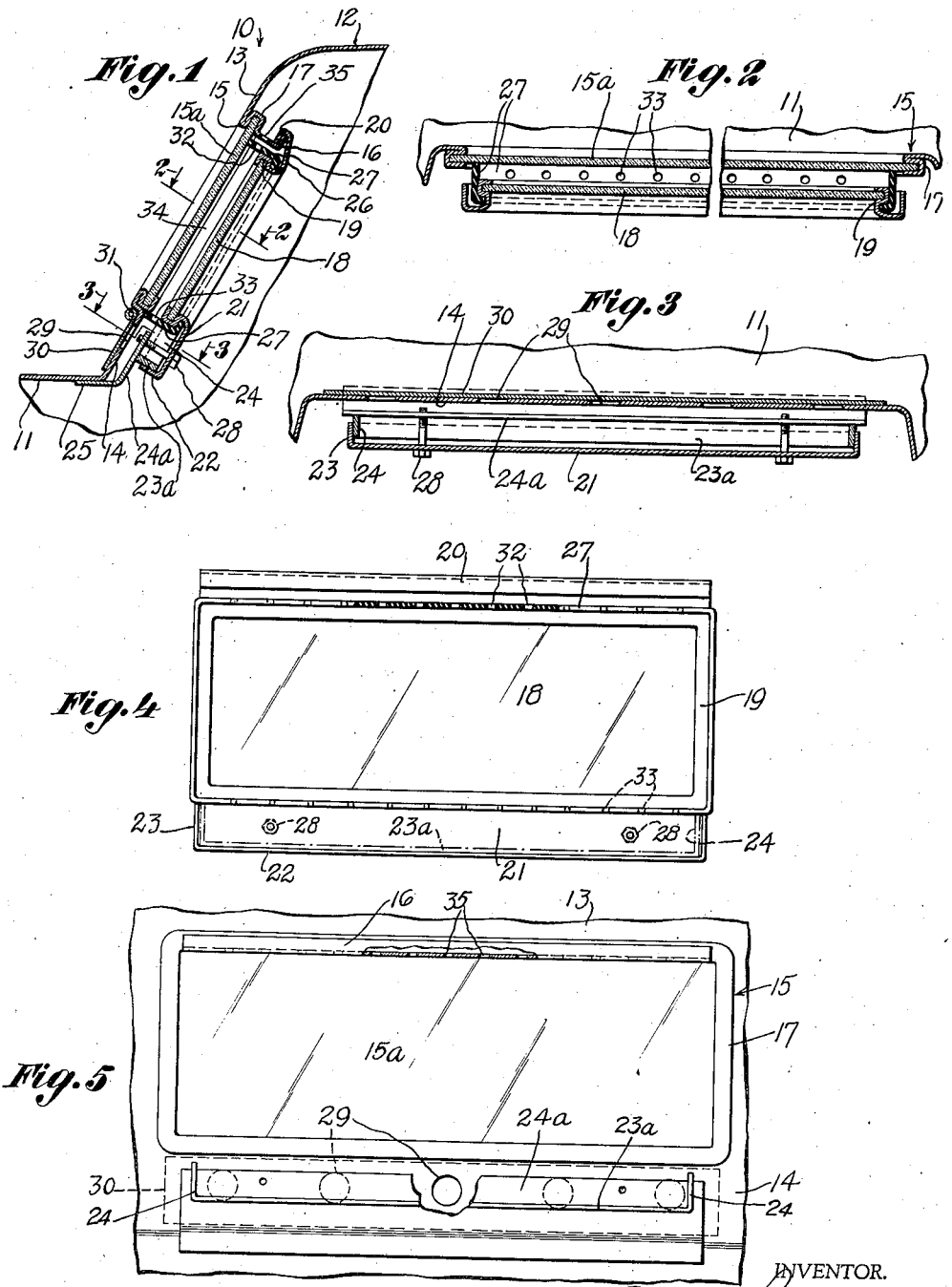
Jan. 16, 1940.   P. PIERI   2,186,990
DOUBLE WINDOW CONSTRUCTION FOR AUTOMOBILES
Filed March 1, 1938

2,186,990

UNITED STATES PATENT OFFICE 2,186,990

DOUBLE WINDOW CONSTRUCTION FOR AUTOMOBILES

Pompeo Pieri, New York, N. Y.

Application March 1, 1938, Serial No. 193,251

5 Claims. (Cl. 98—2)

This invention relates to automobile window constructions.

One object of the invention is to provide an improved automobile window structure which shall provide a substantially confined air space of relatively large size to prevent condensation of moisture on a window with resulting interference with the vision, whereby a frequent cause of collision and other accidents is avoided.

Another object of the invention is to furnish an improved double window structure for automobiles which shall provide a substantially confined air space as set forth, or a ventilation control and guide passage to prevent a draft directly upon the body of a passenger.

Another object of the invention is the provision of a double window structure for an automobile or other vehicle, wherein the inner glass pane is yieldingly mounted so as to cushioningly take up the impact of a passenger when a collision occurs, whereby injury to the passenger even where so called non shatterable glass is used, is avoided.

A further object of the invention is the provision of an automobile window which shall combine the several advantages stated, and which shall be simple and inexpensive in construction, durable, reliable and efficient in use.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a view in vertical section showing a device embodying the invention.

Figs. 2 and 3 are sectional views taken on the respective lines 2—2 and 3—3 of Fig. 1.

Fig. 4 is a view in elevation of the inner window in detached position partly in section.

Fig. 5 is an inside face view of the front wall including the windshield, with the inner window removed, and parts in section.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Generally described, this invention aims to provide a double window construction for automobiles so improved as to afford several distinct advantages. Heretofore it has been found that the automobile windows become befogged by condensation of vapor, as in winter, so that vision is difficult. According to the present invention, one of the glass panes of the window construction, either the inner or outer, but preferably the former, is readily removably mounted in operative position, so that it may be removed in warm weather, if desired, and so that access can be readily had for cleaning the glass panes. With this feature, the invention also provides for ventilation so that the double window construction can be used in all weather, by utilizing it in an improved manner to direct the air flow so as to avoid direct draft upon the passengers by discharging the air as at the top of the automobile, while the air inlet is a rainproof easily controlled means near the bottom of the window structure. I have noted that even where shatterproof glass is used, cases are on record of persons whose heads were driven through the windshield on collision. With the present invention, one of the window panes is resiliently mounted so as to yield and cushion an impact of a passenger thereon. It will be appreciated that the invention is applicable to any and all windows of an automobile or other vehicle.

Referring in detail to the drawing, 10 denotes a device embodying the invention. The same illustratively includes an automobile of which the hood and roof of the body are shown at 11 and 12 respectively. The automobile may also have front wall portions 13, 14 mounting a channel frame 15 for securing the windshield 15a. Mounted on the wall portion 13 is a hook portion 16 in the nature of a continuous channel that faces upward. If desired, the hook portion 16 may be formed integral with the front wall 13 by means of a series of reverse folds to thus provide the hook portion 16 and a channel 17 for holding the windshield. Mounted on the hook portion for swinging movement is a glass pane 18 having a marginal frame 19 provided at the upper portion of said window with a continuous downwardly directed hook portion 20 adapted to engage the hook portion 16. At the lower side of the window 18, the frame 19 thereof may be formed with a downward extending wall 21 having a bottom flange 22 and end flanges 23 adapted to snugly slidingly engage a closure comprising a flange 23a having end flanges 24, said closure being mounted on a plate 24a that is fixed to the hood at 25 or other appropriate part of the automobile body. It is noted that with the hook portion 20 connected to the frame 19 by a rearwardly disposed wall portion 26, the frame is marginally free to receive a strip of rubber sheeting 27 which engages tightly continuously around the frame 19 so as to be secured thereon. This rubber sheet member 27 extends forward and is adapted for continuous contact with the windshield 15a or the front wall of the automobile or both, and it may possess sufficient body and strength to serve as a resilient bumper for the window 18. To hold the latter generally parallel to the forwardly inclined windshield, and with the front edge of the rubber member 27 in contact with the adjacent front parts of the car body, a bolt 28 may extend freely through the wall 21 into threaded engagement with the wall 24a whereby the member 27 may be adjustably compressed, and any possible rattling avoided.

If ventilation be desired, a series of openings 29 may be provided in the wall 14, closable by a flap member 30 pivotally mounted at 31 on the wall 14. Preferably also the strip member 27 may be perforated at 32, 33 along the top and bottom stretches thereof, but being otherwise imperforate, the two windows 15a, 18 form a passage 34 in conjunction with the member 27 whereby air entering through the openings 29 in the upraised position of the vane 30, flows into the chamber afforded by the members 21 to 24 and thence through the openings 33, the passages 34, the openings 32 and thence through openings 35 in the hook portion 16 and thus into the passenger compartment of the automobile.

It will now be seen that when the vane 30 is in closed position, the passage 34 constitutes a virtually confined insulating air space so that vision will not be marred by condensation of vapor. But if ventilation be desired, as in weather that is not very cold, the vane 30 may be opened and held open frictionally or otherwise to permit circulation of air upward toward the roof of the car without direct draft upon the passengers. Nevertheless, if it should rain, the plate 30 affords a leaktight closure. If, in the event of a collision, a passenger should strike his head against the window 18, the same will yield and cushion the shock due to the rubber bumper member 27. If it be desirable to remove the window 18 as in summer, or in order to clean the windows, it is merely necessary to detach the bolt 28 and unhook the window 18 by raising it to raise the hook portion 20 off the hook portion 16. The engagement at 22, 23a may be concentric with the hook means 16, 20 to facilitate movement of the window 18.

I claim:

1. A device including an automobile window having a main outer pane, a secondary inner pane, means pivotally mounting the latter at its upper edge for movement toward and away from the main pane, and elastic means to maintain the panes substantially uniformly spaced apart, including a sheet member of pliable material lying with its width at an angle to the panes to form a marginal wall for substantially enclosing the space between the panes, so that the secondary pane is movable pivotally outward under impact.

2. A device including an automobile window having a main outer pane, a secondary inner pane, means pivotally mounting the latter at its upper edge for movement toward and away from the main pane, and elastic means to maintain the panes substantially uniformly spaced apart, including a sheet member of pliable material lying with its width at an angle to the panes to form a marginal wall for substantially enclosing the space between the panes, so that the secondary pane is movable pivotally outward under impact, said wall being elastic and having ventilating openings therethrough increasing the elasticity thereof.

3. A device including an automobile window having a main outer glass pane, an inner secondary glass pane, and means interengaging said panes to provide a confined air space therebetween, said means having a portion affording substantially constricted communication between said air space and the interior of the automobile at the top of said air space to permit said air space to have a temperature above that of the main pane and below that of the atmosphere in the automobile, said means including a marginal wall for said air space consisting of an elastic material of substantial width for movement under impact of the secondary pane toward the main pane, said communication being by means of openings formed in the said wall and serving to increase the yieldability of said wall.

4. A device including an automobile window having an outer main pane, an inner secondary pane, a yieldable wall marginally interengaging said panes for relative movement therebetween and to provide a substantially confined air space between said panes, said wall having an air opening therein, a duct having a telescopic wall, said duct communicating with said opening and being engaged with the secondary pane so as to move with the latter, and relatively fixed air control means for the telescopic duct.

5. A device according to claim 4, wherein pivotal means supports the secondary pane at the top thereof, and the telescopic duct includes a wall movable with relation to the axis of the pivotal means.

POMPEO PIERI.